United States Patent
Kim

(10) Patent No.: US 7,433,008 B2
(45) Date of Patent: Oct. 7, 2008

(54) LIQUID CRYSTAL DISPLAY DEVICE WITH DATA AND GATE LINK LINES HAVING HOLES FOR RESISTANCE COMPENSATION FOR PROVIDING CONSTANT CURRENT FLOW THEREBETWEEN

(75) Inventor: Kang Suk Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 514 days.

(21) Appl. No.: 11/023,340

(22) Filed: Dec. 29, 2004

(65) Prior Publication Data

US 2005/0206798 A1  Sep. 22, 2005

(30) Foreign Application Priority Data

Mar. 17, 2004 (KR) .................. 10-2004-0017937

(51) Int. Cl.
*G02F 1/1345* (2006.01)

(52) U.S. Cl. .................. 349/152; 349/139; 349/140

(58) Field of Classification Search .............. 349/139, 349/143, 140, 152
See application file for complete search history.

(56) References Cited

U.S. PATENT DOCUMENTS 5,870,163 A    2/1999  Watanabe et al.
6,104,465 A *  8/2000  Na et al. .............. 349/152
6,587,176 B2 * 7/2003  Kim .................... 349/149
7,050,135 B2 * 5/2006  Kim .................... 349/139

FOREIGN PATENT DOCUMENTS

KR    10-0237679    3/1999

* cited by examiner

*Primary Examiner*—David C. Nelms
*Assistant Examiner*—John Heyman
(74) *Attorney, Agent, or Firm*—Birch, Stewart, Kolasch & Birch, LLP

(57) ABSTRACT

A liquid crystal display (LCD) device compensates the resistance value for differing line lengths by forming resistance compensation holes in gate and data link lines, and obtains a constant current flowing in the gate and data lines, and includes an active region including a plurality of gate and data lines crossing each other to define a plurality of pixel regions, and a thin film transistor and a pixel electrode formed in each pixel region; gate link lines and a data link lines respectively extending from the gate lines and the data lines in the periphery of the active region; first resistance compensation holes in the gate link lines to compensate a resistance value of the gate link lines having different lengths; second resistance compensation holes in the data link lines to compensate a resistance value of the data link lines having different lengths; a gate pad at an end of the gate link lines; and a data pad at an end of the data link lines.

6 Claims, 4 Drawing Sheets

LIQUID CRYSTAL DISPLAY DEVICE WITH DATA AND GATE LINK LINES HAVING HOLES FOR RESISTANCE COMPENSATION FOR PROVIDING CONSTANT CURRENT FLOW THEREBETWEEN

This application claims the benefit of the Korean Application No. 10-2004-0017937 filed on Mar. 17, 2004, which is hereby incorporated by reference.

BACKGROUND OF THE INVENTION

1. Field of the Invention

The present invention relates to a liquid crystal display (LCD) device, and more particularly, to a liquid crystal display (LCD) device and to a method for producing a liquid crystal device, wherein a constant current flows in lines by compensating a resistance value for a line length on pad link lines having different lengths.

2. Discussion of the Background Art

Liquid crystal display (LCD) devices, having advantageous characteristics such as high contrast ratio, great gray level, great picture quality and low power consumption are now the subject of increased research and study. The LCD device is especially suitable for an ultra-thin display device such as a wall-mountable TV. Also, the LCD device has attracted a deal of interest as a new display device that can substitute for a CRT in that the LCD device has a thin profile, is light in weight and has low power consumption. As a result, the LCD device may be used as a display device for a notebook computer operated by a battery.

Generally, the LCD device includes a thin film transistor array substrate having a thin film transistor and a pixel electrode in a pixel region defined by crossing gate and data lines, a color filter substrate having a color filter layer, a black matrix layer and a common electrode, and a liquid crystal layer between the two substrates, wherein liquid crystal molecules of the liquid crystal layer are aligned by applying a voltage to electrodes to control light transmittance, thereby displaying a picture image.

The color filter substrate and the thin film transistor array substrate are bonded to each other by a sealant such as epoxy resin. A driving circuit of a PCB (Printed Circuit Board) is connected with the thin film transistor array substrate in a TCP (Tape Carrier Package) method using a driver IC. On the PCB, a plurality of devices (such as ICs of the substrate), are formed to generate various control signals and data signals for driving the LCD device.

Hereinafter, a background art LCD device will be described with reference to the accompanying drawings.

FIG. 1 is a plane view illustrating a thin film transistor array substrate according to the background art. FIG. 2A and FIG. 2B are cross-sectional views illustrating a thin film transistor array substrate according to the background art.

As shown in FIG. 1, the thin film transistor array substrate 11 includes an active region and a pad region, wherein the active region has a unit pixel region P of a matrix-type configuration defined by a gate line 12 and a data line 15, and the pad region having a gate pad 22 and a data pad 25 is connected with a driving circuit on an additional PCB (Printed Circuit Board). The pad region is divided into a gate pad region and a data pad region. A gate link line 32 extends from the gate pad 22, the gate pad 22 being formed at an end of the gate link line 32. Also, a data link line 35 extends from the data pad 25, and the data pad 25 is formed at an end of the data link line 35.

More specifically, as shown in FIG. 1-FIG. 2B, the plurality of gate and data lines 12 and 15 crossing each other are formed on the active region of a glass substrate 11, thereby defining the plurality of pixel regions P. A film TFT is formed at a crossing point of the gate and data lines 12 and 15 (to switch a signal). A storage capacitor (not shown) maintains a charging state until addressing a unit pixel region to the next. A pixel electrode 17 is connected with a drain electrode 15b of the TFT to form an electric field controlling a liquid crystal director. A gate insulating layer 13 is formed between the gate line 12 and the data line 15, and a passivation layer 16 is formed between the TFT and the pixel electrode 17.

In the pad region, the plurality of gate link lines 32 and the gate pads 22 extending from the gate lines 12 are formed to apply gate driving signals of a gate driver to the respective gate lines 12. The plurality of data link lines 35 and the data pads 25 extending from the data lines 15 are formed to apply data signals of a data driver to the respective data lines 15, thereby interfacing electrical signals with the external driving circuits.

To drive the LCD device, the gate pad 22 is in contact with the driving circuit supplying the driving signal through an opening through the gate insulating layer 13 and the passivation layer 16 on the gate pad 22. Similarly, the data pad 25 is in contact with the driving circuit supplying the driving signal through an opening through the passivation layer 16 on the data pad 25. A transparent conductive layer 27, being in contact with the gate pad 22 and the data pad 25, is formed in the open portion, thereby preventing oxidation of the gate and data pads 22 and 25.

The plurality of gate pads 22 and data pads 25 are formed in the periphery of the substrate as groups, whereby gate and data driver ICs are mounted to each group in the TCP method. Thus, the various signals are transmitted from the PCB through the driver ICs. The number of the gate and data driver ICs is variable according to a model or a size of the LCD device. In FIG. 1, the gate pad 22 and the data pad 25, to which one gate driver IC 50 and two data driver ICs 51, 52 are mounted, are described in brief.

As described above, the pad electrodes are formed in groups at the portion corresponding to the driver IC. As shown in FIG. 1, if the gate link line 32 is distanced from the portion corresponding to the gate driver IC, the length of the gate link line 32 increases. Meanwhile, if the gate link line 32 is close to the portion corresponding to the gate driver IC, the length of the gate link line 32 decreases. As a result, each of the gate link lines 32 has different lengths with respect to one another. In the same manner, the data link lines 35 have different lengths.

As the link lines have different lengths, the respective link lines have different resistance values. That is, the current passing through the link lines flows at different speeds. For example, in a case of a long link line, the current flows slowly due to the high resistance value of the long link line. In a case of a short link line, the current flow rapidly due to the low resistance value of the short link line. Accordingly, the current speed of a link line at a relatively greater distance from the driver IC is different from the current speed of a link line closer to the driver IC making it impossible to transmit the same signal at the same time.

SUMMARY OF THE INVENTION

It is an object of the present invention to provide a liquid crystal display device and a method for producing a liquid crystal device in which the timing of signals which are traveling on different link lines are adjusted and thereby improved.

Accordingly, the present invention is directed to a liquid crystal display (LCD) device that substantially obviates one or more problems due to limitations and disadvantages of the background art.

Further, the present invention provides a liquid crystal display (LCD) device to compensate the resistance value for different line lengths by forming resistance compensation holes or recesses in gate and data link lines, whereby a current constantly flows in gate and data lines both distanced from and close to a driver IC.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display (LCD) device is provided, which comprises an active region including a plurality of gate lines and data lines crossing each other to define a plurality of pixel regions, a gate link line and a data link line respectively extending from the gate line and the data line, a first resistance compensation structure including at least one recess or hole in at least one of the gate link lines and/or in at least one of the gate lines to compensate a resistance value of the gate link lines, and/or a second resistance compensation structure including at least one recess or hole in at least one of the data link lines and/or in at least one of the data lines to compensate a resistance value of the data link lines. Further, a method for producing a liquid crystal device is provided, comprising forming an active region including a plurality of gate lines and data lines crossing each other to define a plurality of pixel regions, forming a gate link line and a data link line respectively extending from the gate line and the data line, forming a first resistance compensation structure including at least one recess or hole in at least one of the gate link lines and/or in at least one of the gate lines to compensate a resistance value of the gate link lines, and/or forming a second resistance compensation structure including at least one recess or hole in at least one of the data link lines and/or in at least one of the data lines to compensate a resistance value of the data link lines.

According to this invention, it is possible to compensate the resistance value for different line lengths by forming resistance compensation holes or recesses in gate and data link lines or, additionally or alternatively, in gate lines and/or data lines in the active region, whereby a current constantly flows in the gate and data lines. One aspect of this invention relates to a liquid crystal display device comprising structures formed in the link lines between each line in the active region and a corresponding pad in order to compensate the different electrical resistance of the link lines due to the different lengths of the link lines.

Preferably, the first resistance compensation structure is formed at the same time as the gate link line is formed. Moreover, the second resistance compensation structure may be formed at the same time the data link line is formed. In this case, the device can be manufactured with a very small number of method steps.

Preferably, the longest data link line does not include the second resistance compensation structure. By taking this measure, the number of resistance compensation structures to be manufactured is reduced, and the resistance can be kept as small as possible.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, a liquid crystal display (LCD) device according to the present invention will be described with reference to the accompanying drawings.

Figure 1:
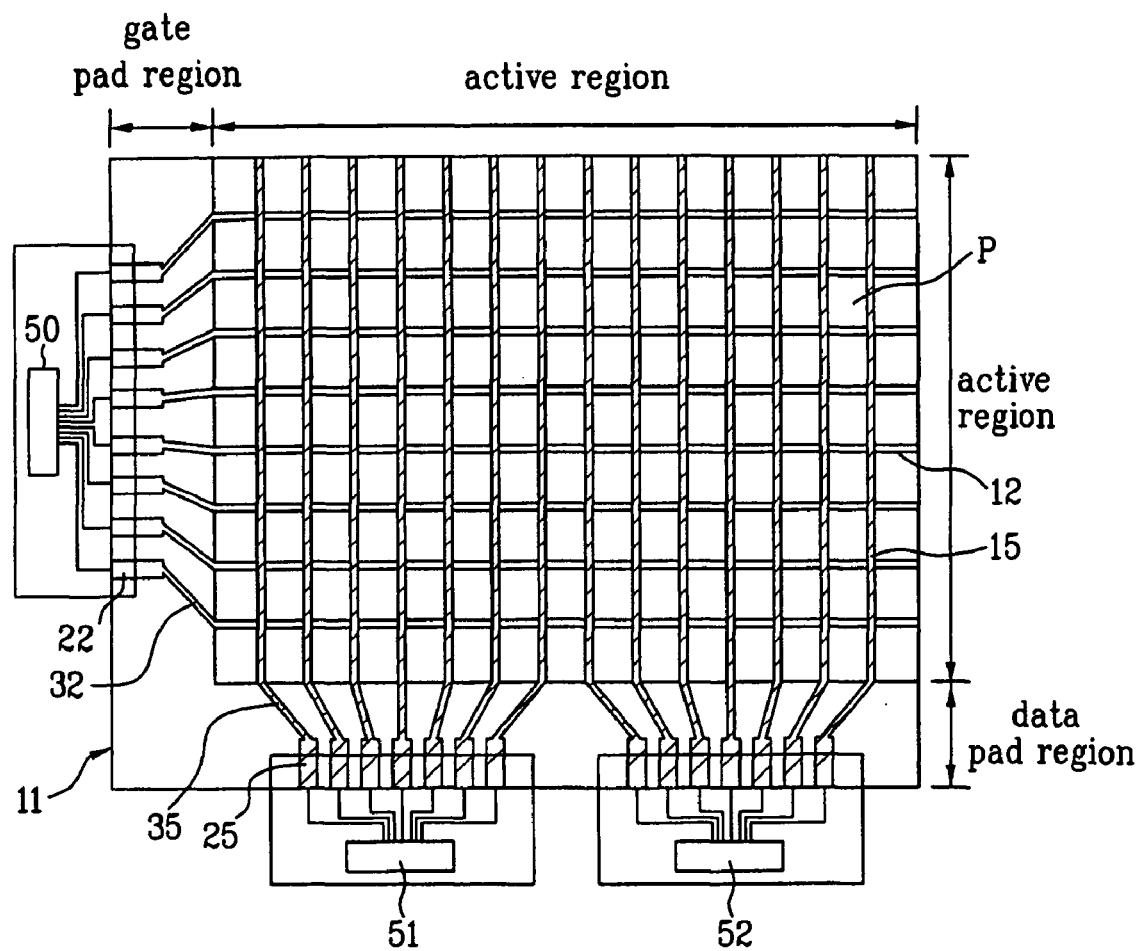
FIG. 1 is a plane view illustrating a thin film transistor array substrate according to the background art.
Figure 2A:
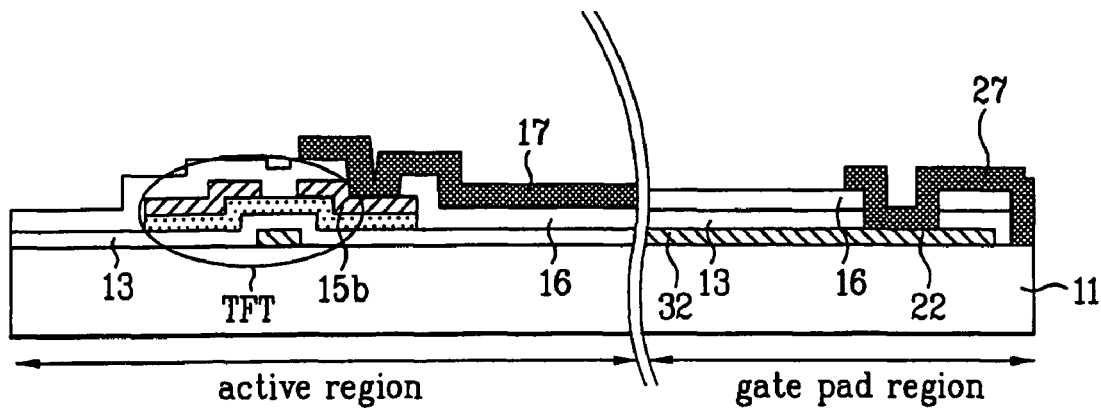
FIG. 2A and FIG. 2B are cross-sectional views illustrating a thin film transistor array substrate according to the background art.
Figure 2B:
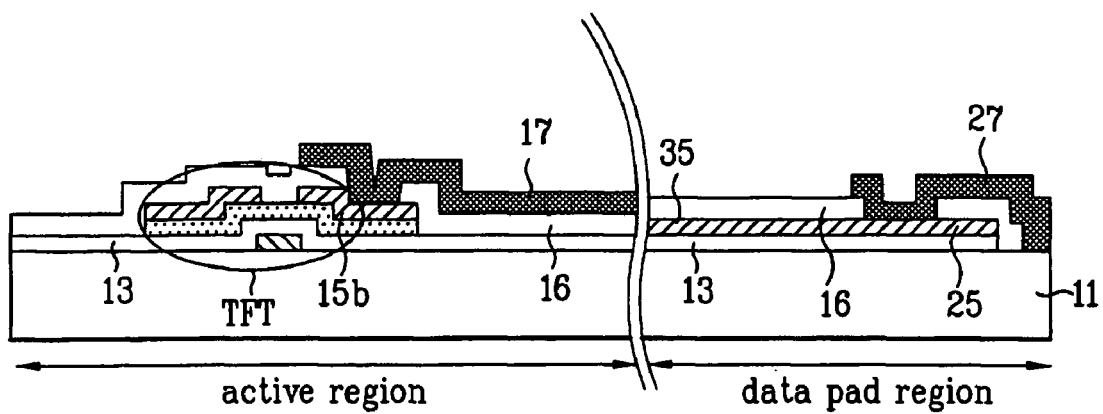
Figure 3:
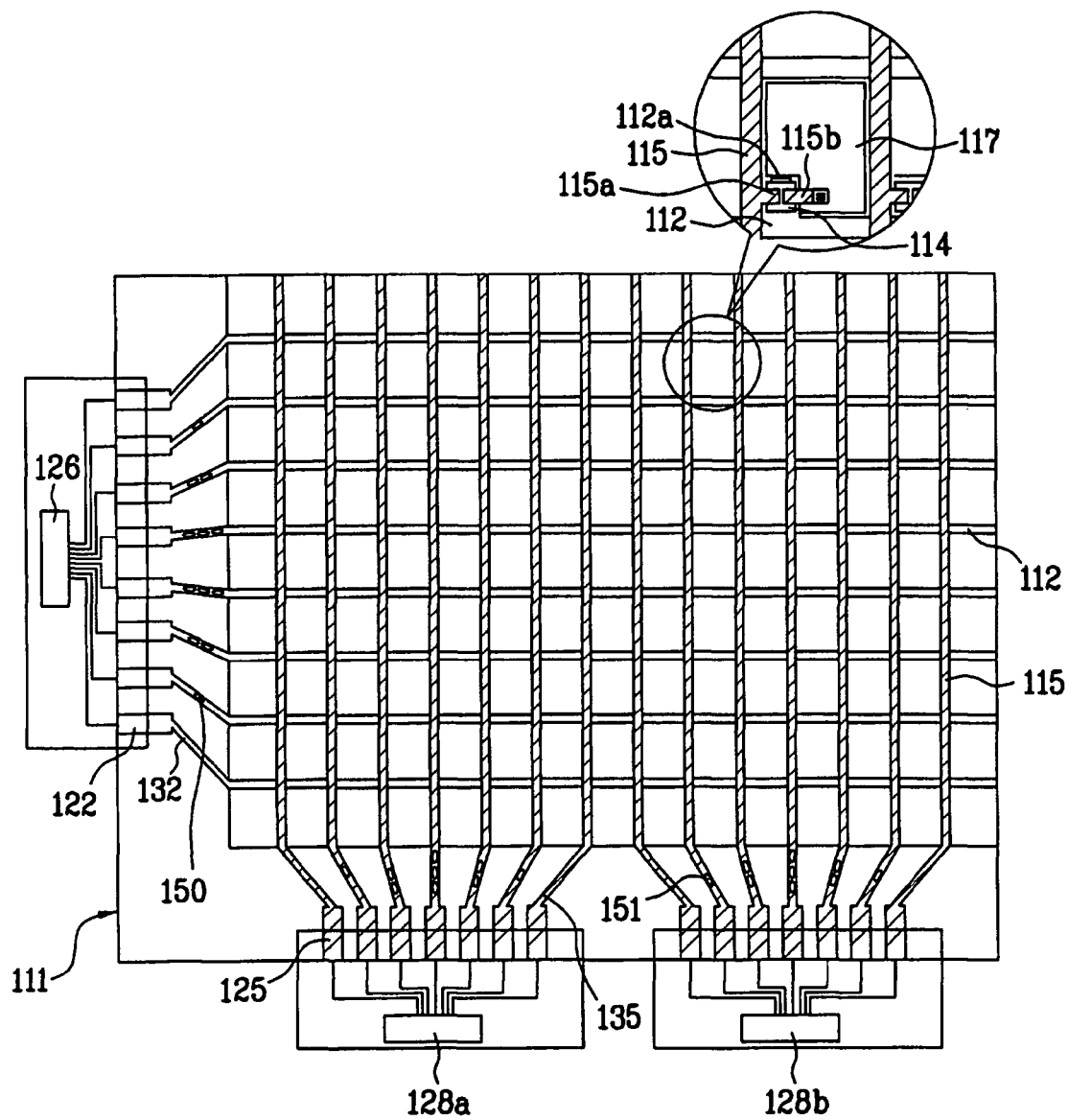
FIG. 3 is a plane view illustrating a thin film transistor array substrate according to the present invention.
Figure 4A:
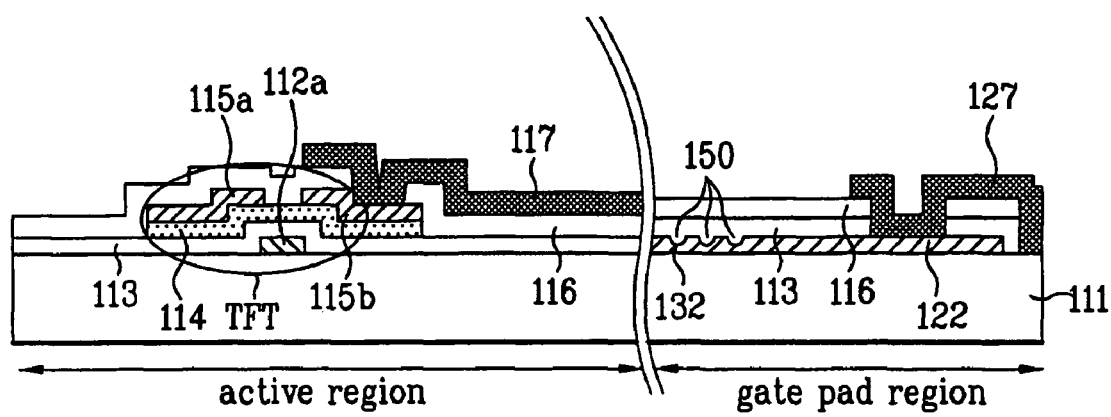
FIG. 4A and FIG. 4B are cross-sectional views illustrating a thin film transistor array substrate according to the present invention.
Figure 4B:
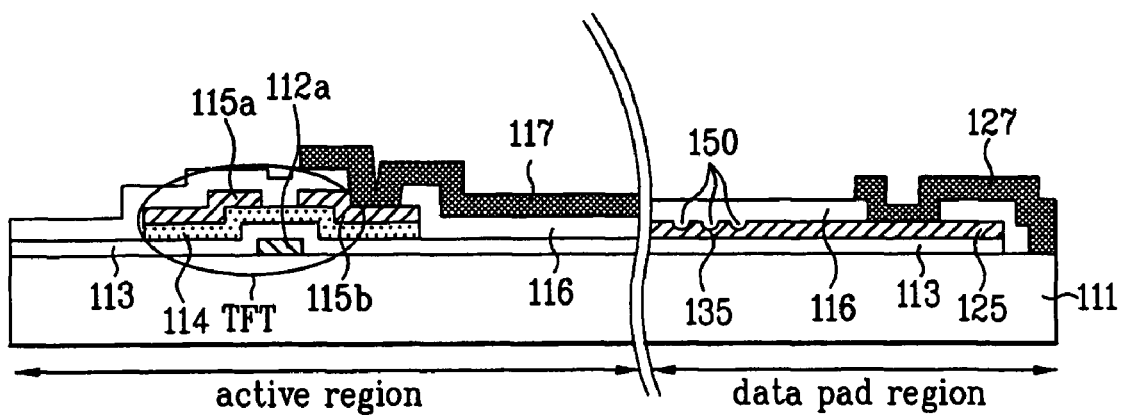

FIG. 3 is a plane view illustrating a thin film transistor array substrate according to the present invention. FIG. 4A and FIG. 4B are cross-sectional views illustrating a thin film transistor array substrate according to the present invention.

The LCD device includes a color filter substrate, a thin film transistor array substrate, and a liquid crystal layer. The color filter substrate has a color filter layer to realize various colors, and the thin film transistor array substrate includes an active region having a switching device to change an alignment direction of liquid crystal molecules, and a pad region being in contact with an external driving circuit. The liquid crystal layer is formed between the two substrates. Herein, the explanation for the present invention will be limited to the thin film transistor array substrate of the LCD device.

As shown in FIG. 3-FIG. 4B, the thin film transistor array substrate 111 includes the active region having a plurality of pixel regions defined by a plurality of gate and data lines 112 and 115 crossing each other, and the pad region having a plurality of gate link lines 132 extending from the respective gate lines 112, a gate pad 122 formed in each end of the gate link lines 132, a plurality of data link lines 135 extending from the respective data lines 115, and a data pad 125 formed in each end of the data link lines 135.

At this time, first and second resistance compensation holes 150 and 151 are respectively formed in the gate link line 132 and the data link line 135, wherein the number of the first and second resistance compensation holes 150 and 151 are in inverse proportion to the length of the gate link line 132 and the data link line 135. More specifically, the plurality of gate and data lines 112 and 115 crossing each other are formed in the active region, and thin film transistors TFTs are formed at respective crossing points of the plurality of gate and data lines 112 and 115, wherein the thin film transistor acts as a switching device. Also, a pixel electrode 117 is formed in each pixel region.

Although not shown in FIG. 3, resistance compensation structures might also be provided in the active region of the thin film transistor array substrate 111. However, in this case the formation of such resistance compensation structures can already be considered in the design of the circuit, since the resistance compensation structures have an influence on the propagation times of signals. If the resistance compensation structures are formed in a portion of the active region between the gate link lines 132 and the particular data line 115 which is oriented in the very left part of the active region (see FIG. 3), i.e., between the gate link lines 132 and the first column, then the provision of resistance compensation structures has the same effect on all the pixels of a row, which makes the calculation of propagation times very easy. If the resistance compensation structures are formed in a portion of the active region between the data link lines 135 and the particular gate line 112 which is oriented in the very bottom part of the active region (see FIG. 3), i.e., between the data link lines 135 and the first row, then the provision of resistance compensation structures has the same effect on all the pixels of a column, which makes the calculation of propagation times very easy.

In this state, the TFT includes a gate electrode 112a, a gate insulating layer 113, a semiconductor layer 114, and source/drain electrodes 115a/115b. At this time, the gate electrode 112a is diverged from the gate line 112, and the gate insulating layer 113 is formed in a method of depositing an inorganic insulating material such as silicon oxide $SiO_x$ or silicon nitride $SiN_x$ on an entire surface of the substrate including the gate electrode 112a. Also, an amorphous silicon (a-Si:H) layer is formed on the gate insulating layer 113 above the gate electrode 112, thereby forming the semiconductor layer 114. Then, the source/drain electrodes 115a/115b diverged from the data line 115 are formed on the semiconductor layer 114. Further, the drain electrode 115b is connected with the pixel electrode 117 through a passivation layer 116.

To form the gate and data lines 112 and 115, a low-resistance metal material such as copper Cu, aluminum Al, aluminum neodymium AlNd, molybdenum Mo, chrome Cr, titanium Ti, tantalum Ta or molybdenum-tungsten MoW is deposited by sputtering, and then patterned. Also, the pixel electrode 117 is formed in a method of depositing and patterning a transparent conductive material such as ITO (Indium-Tin-Oxide) or IZO (Indium-Zinc-Oxide) on the passivation layer 116.

Further, the pad region includes the gate pad 122 applying a gate driving signal to each gate line 112, and the data pad 125 applying a data signal to each data line 112, thereby interfacing an electrical signal with the external driving circuit. At this time, the plurality of gate pads 122 and the data pads 125 are formed in a group at a portion corresponding to a driver IC. FIG. 3 shows one gate driver IC 126 coupled to the gate pads 122, and two data driver ICs 128a and 128b coupled to the data pads 125, A first gate driver IC 128a coupled to a first part of the data pads 125 and a second data driver IC 128b coupled to a second part of the data pads 125.

At this time, the gate line 112 and the gate pad 122 are formed as one by the gate link line 132, and the data line 112 and the data pad 125 are formed as one by the data link line 135. Accordingly, the distance between the driver IC and each gate line 112 is not constant, and the length of the gate link line 132 connecting the gate line 112 to the gate pad 122 is varied accordingly. Thus, the propagation time of the current through the line is variable as the length in each gate link line 132 is variable. In this case, it is possible to provide the plurality of first resistance compensation holes 150 in the short gate link line 132, thereby increasing the resistance value. The first resistance compensation holes 150 are formed at the same time the gate link line 132 is patterned.

When forming the first resistance compensation holes 150, it is not necessary to expose a lower layer. Rather, the goal here is to obtain a constant resistance value in the respective gate link lines having the different lengths by decreasing the cross-section in which the current flows with the first resistance compensation hole 150. For example, in case of the longest gate link line 132, it is not required to form the first resistance compensation hole 150. As the length of the gate link line 132 decreases, it is necessary to increase the number of the first resistance compensation holes 150, thereby controlling the resistance value. That is, the length of the gate link line 132 is in inverse proportion to the number of the first resistance compensation holes 150. In the same way, it is possible to obtain the constant resistance value in the respective data link lines 135 having the different lengths by controlling the number of the second resistance compensation holes 151 of the data link line 135.

Accordingly, constant current flows in the gate line 112 through the gate link line 132 having the first resistance compensation hole 150, and constant current flows in the data line 115 through the data link line 135 having the second resistance compensation hole 151. At this time, the gate link line 132 and the gate pad 122 are formed at the same time as the gate line 112, and the data link line 135 and the data pad 125 are formed at the same time as the data line 115. Also, the first resistance compensation hole 150 is formed when patterning the gate link line 132, and the second resistance compensation hole 151 is formed when patterning the data link line 135. Thus, the gate insulating layer 113 is interposed between the gate link line 132 and the data link line 135, and the passivation layer 116 is formed on the entire surface of the substrate including the data link line 135. Although not shown, an island-shaped dummy pattern is formed between the gate link line 132 and the data link line 135, whereby the passivation layer 116 is formed at a constant thickness.

As mentioned above, the LCD device according to the present invention has the following advantages.

In the LCD device according to the present invention, it is possible to compensate the resistance value in the respective link lines having the different lengths by forming the resistance compensation hole(s) in the short link line(s), so that the constant current flows in all the lines apart from and close to the driver IC.

Also, the resistance compensation hole is formed in a method of removing the link line in a manner so as to prevent a short circuit when patterning the link line, whereby it is not required to carry out an additional process for patterning the resistance compensation hole. That is, it is possible to obtain the constant current flowing in the lines by compensating the resistance value of the link line without the additional process.

As compared with a background method of patterning the pad link line in the curved shape, the LCD device according to the present invention is fabricated using a simplified designing process. Also, the LCD device according to the present invention realizes a high-resolution display because of a decrease in the area occupied by the link lines.

It will be apparent to those skilled in the art that various modifications and variations can be made in the present invention. Thus, it is intended that the present invention covers the modifications and variations of this invention which fall within the scope of the appended claims and their equivalents.

What is claimed is:

1. A liquid crystal display (LCD) device comprising:
    an active region including a plurality of gate lines and data lines crossing each other;
    gate pads and data pads;
    gate link lines between the gate lines and the gate pads;
    data link lines between the data lines and the data pads;
    a first resistance compensation structure including at least one recess or hole in at least one of the gate link lines to compensate a resistance value of the gate link lines; and
    a second resistance compensation structure including at least one recess or hole in at least one of the data link lines to compensate a resistance value of the data link lines, wherein the first resistance compensation structure is formed at the same time the gate link lines are patterned and the second resistance compensation structure is formed at the same time the data link lines are patterned,
    wherein the number of first resistance compensation structures in the gate link lines increases with decreasing lengths of the gate link lines, and the number of second resistance compensation structures in the data link lines increases with decreasing lengths of the data link lines, and
    wherein the longest gate link line does not include the first resistance compensation structure, and the longest data link line does not include the second resistance compensation structure.

2. The liquid crystal display device according to claim 1, wherein a constant current is transmitted to the gate lines through the gate link lines having the first resistance compensation structure.

3. The liquid crystal display device according to claim 1, wherein a constant current is transmitted to the data lines through the data link lines having the second resistance compensation structure.

4. A method for producing a liquid crystal display device, comprising the steps of:
    forming an active region including a plurality of gate lines and data lines crossing each other;
    forming gate link lines and data link lines extending from the gate lines and the data lines, respectively;
    forming gate pads and data pads at ends of the gate and data link lines; and
    forming a first resistance compensation structure including at least one recess or hole in at least one of the gate link lines to compensate a resistance value of the gate link lines, and/or forming a second resistance compensation structure including at least one recess or hole in at least one of the data link lines to compensate a resistance value of the data link lines,
    wherein the first resistance compensation structure is formed at the same time the gate link lines are patterned and the second resistance compensation structure is formed at the same time the data link lines are patterned,
    wherein the number of the formed first resistance compensation structures in the gate link lines increases with decreasing lengths of the gate link lines and/or the gate lines, and the number of the formed second resistance compensation structures in the data link lines increases with decreasing lengths of the data link lines and/or the data lines, and
    wherein the first resistance compensation structure is not formed in the longest gate link line, and the second resistance compensation structure is not formed in the longest data link line.

5. The method according to claim 4, wherein the first resistance compensation structure is formed such that a constant current is transmitted to the gate lines through the gate link lines having the first resistance compensation structure.

6. The method according to claim 4, wherein the second resistance compensation structure is formed such that a constant current is transmitted to the data lines through the data link lines having the second resistance compensation structure.

* * * * *